(12) United States Patent
Naijo et al.

(10) Patent No.: US 9,069,222 B2
(45) Date of Patent: Jun. 30, 2015

(54) ELECTROCHROMIC DISPLAY ELEMENT AND DISPLAY DEVICE

(71) Applicants: Yoshihisa Naijo, Kanagawa (JP); Tohru Yashiro, Kanagawa (JP); Yoshinori Okada, Kanagawa (JP); Shigenobu Hirano, Kanagawa (JP); Koh Fujimura, Tokyo (JP); Kazuaki Tsuji, Kanagawa (JP); Hiroyuki Takahashi, Kanagawa (JP); Sukchan Kim, Kanagawa (JP); Keiichiroh Yutani, Kanagawa (JP); Toshiya Sagisaka, Kanagawa (JP)

(72) Inventors: Yoshihisa Naijo, Kanagawa (JP); Tohru Yashiro, Kanagawa (JP); Yoshinori Okada, Kanagawa (JP); Shigenobu Hirano, Kanagawa (JP); Koh Fujimura, Tokyo (JP); Kazuaki Tsuji, Kanagawa (JP); Hiroyuki Takahashi, Kanagawa (JP); Sukchan Kim, Kanagawa (JP); Keiichiroh Yutani, Kanagawa (JP); Toshiya Sagisaka, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/167,091

(22) Filed: Jan. 29, 2014

(65) Prior Publication Data
US 2014/0268284 A1 Sep. 18, 2014

(30) Foreign Application Priority Data

Mar. 15, 2013 (JP) .................................. 2013-054303

(51) Int. Cl.
*G02F 1/153* (2006.01)
*G02F 1/15* (2006.01)
*G09G 3/38* (2006.01)
*G02F 1/155* (2006.01)
*G02F 1/163* (2006.01)

(52) U.S. Cl.
CPC *G02F 1/155* (2013.01); *G02F 1/15* (2013.01); *G02F 1/153* (2013.01); *G02F 1/163* (2013.01); *G02F 1/1523* (2013.01); *G09G 3/38* (2013.01); *G02F 2001/1552* (2013.01); *G02F 2001/1536* (2013.01); *G09G 2300/023* (2013.01); *G09G 2300/0426* (2013.01); *G09G 2310/063* (2013.01); *G09G 2320/0209* (2013.01); *G09G 2320/0242* (2013.01); *Y10T 29/49117* (2015.01)

(58) Field of Classification Search
CPC ....... G02F 1/15; G02F 1/1523; G02F 1/1533; G02F 1/153; G02F 1/1525; G02F 1/1347; G02F 1/157; G02F 1/163; G02F 2001/1536; G02F 2001/1552; G02F 2201/16; G02F 2202/36; G09G 3/38; G09G 2300/0426; G09G 2300/0452; G09G 2310/063; G09G 2300/023; G09G 2320/0209; G09G 2320/0242; Y10T 29/49117; Y10T 156/10
USPC ...................... 359/265–274; 345/105; 29/825
See application file for complete search history.

(56) References Cited

U.S. PATENT DOCUMENTS

| 7,880,955 B2 | 2/2011 | Naijo et al. |
| 7,952,791 B2 | 5/2011 | Yanagisawa et al. |
| 7,999,992 B2 * | 8/2011 | Mazurkiewicz et al. ..... 359/273 |

(Continued)

*Primary Examiner* — Loha Ben
(74) *Attorney, Agent, or Firm* — Cooper & Dunham LLP

(57) ABSTRACT

Disclosed is an electrochromic display element, including a display substrate, an opposed substrate that is opposed to the display substrate, an opposed electrode being formed at a display-substrate-opposed side of the opposed substrate, a first display electrode and a first electrochromic layer being laminated at an opposed-substrate-opposed side of the display substrate, a single porous film being formed between the display substrate and the opposed substrate, a second display electrode and a second electrochromic layer being laminated at a display-substrate-opposed side of the porous film, a third display electrode and a third electrochromic layer being laminated at an opposed-substrate-opposed side of the porous film, and an electrolyte being present between the display substrate and the opposed substrate.

6 Claims, 3 Drawing Sheets

(56) References Cited

U.S. PATENT DOCUMENTS

| | | |
|---|---|---|
| 8,144,117 B2 | 3/2012 | Okada et al. |
| 8,384,983 B2 * | 2/2013 | Yashiro et al. .............. 359/269 |
| 8,441,713 B2 | 5/2013 | Kawashima et al. |
| 8,531,754 B2 | 9/2013 | Fujimura et al. |
| 8,687,262 B2 * | 4/2014 | Yashiro et al. .............. 359/270 |
| 8,736,941 B2 * | 5/2014 | Naijo et al. ................. 359/270 |
| 8,743,048 B2 * | 6/2014 | Takahashi et al. ........... 345/105 |
| 8,902,151 B2 * | 12/2014 | Yashiro et al. .............. 345/105 |
| 2011/0222139 A1 | 9/2011 | Naijo et al. |
| 2012/0125414 A1 | 5/2012 | Kamezaki et al. |
| 2012/0139824 A1 | 6/2012 | Takahashi et al. |
| 2012/0139825 A1 | 6/2012 | Yashiro et al. |
| 2012/0154892 A1 | 6/2012 | Yashiro et al. |
| 2013/0250394 A1 | 9/2013 | Okada et al. |
| 2013/0258439 A1 | 10/2013 | Naijo et al. |
| 2013/0335802 A1 | 12/2013 | Kim et al. |

* cited by examiner

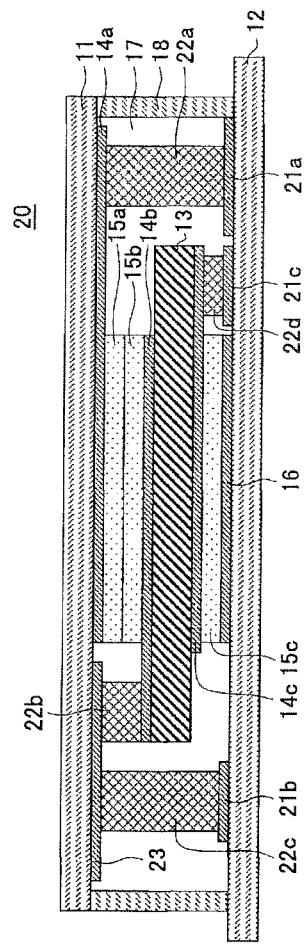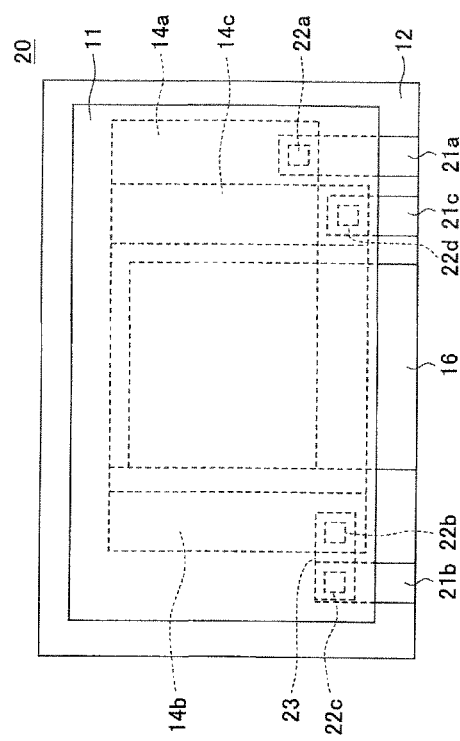
FIG.3A
FIG.3B

ELECTROCHROMIC DISPLAY ELEMENT AND DISPLAY DEVICE

BACKGROUND OF THE INVENTION

1. Field of the Invention

An aspect of the present invention relates to at least one of an electrochromic display element and a display device.

2. Description of the Related Art

In recent years, development of electronic paper has been conducted actively as an electronic medium that replaces paper. An electrochromic display device has been known as a display device for use as electronic paper. Herein, a phenomenon of an optical or physical property being changed reversibly by applying a voltage is referred to as electrochromism. Furthermore, an electrochromic display device is a display device that utilizes coloration and discoloration of an electrochromic compound that exhibits electrochromism. A study and development of an electrochromic display device such as material development and a device design have widely been conducted as a promising candidate in a technique for a display device for use as electronic paper because of being a reflection-type display device, having a retention effect, and being capable of being driven at a low voltage.

Japanese Patent Application Publication No. 2011-209688 discloses an electrochromic display device having a stack of a display electrode and an electrochromic layer, a film having a through-hole provided at either one side of a display electrode side or an electrochromic layer side of the stack, and an opposed substrate with an opposed electrode that is opposed to the display electrode being provided thereon. Herein, a plurality of the stacks are included wherein a film that has a through-hole is provided at either one side of a display electrode side or an electrochromic layer side of each of the plurality of the stacks.

However, it is desired that light loss is further suppressed.

SUMMARY OF THE INVENTION

According to one aspect of the present invention, there is provided an electrochromic display element, including a display substrate, an opposed substrate that is opposed to the display substrate, an opposed electrode being formed at a display-substrate-opposed side of the opposed substrate, a first display electrode and a first electrochromic layer being laminated at an opposed-substrate-opposed side of the display substrate, a single porous film being formed between the display substrate and the opposed substrate, a second display electrode and a second electrochromic layer being laminated at a display-substrate-opposed side of the porous film, a third display electrode and a third electrochromic layer being laminated at an opposed-substrate-opposed side of the porous film, and an electrolyte being present between the display substrate and the opposed substrate.

According to another aspect of the present invention, there is provided a display device, including the electrochromic display element as described above.

BRIEF DESCRIPTION OF THE DRAWINGS

FIG. 3A and FIG. 3B are diagrams that illustrate another example of an electrochromic display element.

DETAILED DESCRIPTION OF THE PREFERRED EMBODIMENTS

Next, an embodiment of the present invention will be described in conjunction with the drawings.

Figure 1:
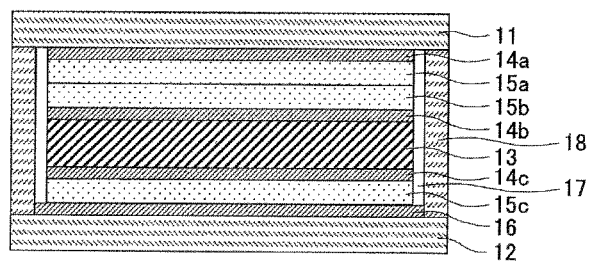
FIG. 1 is a cross-sectional view that illustrates one example of an electrochromic display element.

FIG. 1 illustrates one example of an electrochromic display element.

An electrochromic display element 10 has a display substrate 11 and an opposed substrate 12 that is opposed to the display substrate 11, and a porous film 13 is formed between the display substrate 11 and the opposed substrate 12. Furthermore, a first display electrode 14a and a first electrochromic layer 15a are sequentially laminated at an opposed-substrate-12-opposed side of the display substrate 11, and an opposed electrode 16 is formed at a display-substrate-11-opposed side of the opposed substrate 12. Moreover, a second display electrode 14b and a second electrochromic layer 15b are sequentially laminated at a display-substrate 11-opposed side of the porous film 13. Furthermore, a third display electrode 14c and a third electrochromic layer 15c are sequentially laminated at an opposed-substrate-12-opposed side of the porous film 13. Moreover, an electrolyte solution 17 is present between the display substrate 11 and the opposed substrate 12. Furthermore, the display substrate 11 and the opposed substrate 12 are bonded via a spacer 18.

The first display electrode 14a is an electrode for controlling an electric potential on the opposed electrode 16 and coloring and/or discoloring the first electrochromic layer 15a. The second display electrode 14b is an electrode for controlling an electric potential on the opposed electrode 16 and coloring and/or discoloring the second electrochromic layer 15b. The third display electrode 14c is an electrode for controlling an electric potential on the opposed electrode 16 and coloring and/or discoloring the third electrochromic layer 15c.

The first electrochromic layer 15a, the second electrochromic layer 15b, and the third electrochromic layer 15c contact and are formed on the first display electrode 14a, the second display electrode 14b, and the third display electrode 14c, respectively.

Each of the first electrochromic layer 15a, the second electrochromic layer 15b, and the third electrochromic layer 15c includes a metal oxide particle that carries an electrochromic compound that colored and/or discolored by an oxidation-reduction reaction. In such a case, a state is provided in such a manner that a single molecule of an electrochromic compound is bonded to or adsorbed on a metal oxide particle. Thereby, it is possible to transport an electron from a display electrode through a metal oxide particle to an electrochromic compound and it is possible to cause coloration or discoloration thereof efficiently.

The first electrochromic layer 15a, the second electrochromic layer 15b, and the third electrochromic layer 15c are colored with different colors and/or discolored due to donation and/or acceptance of an electron from the first display electrode 14a, the second display electrode 14b, and the third display electrode 14c, respectively.

Here, if each of the first electrochromic layer 15a, the second electrochromic layer 15b, and the third electrochromic layer 15c is fixed not to move an electrochromic compound and electrical connection is ensured not to inhibit donation or acceptance of an electron involved with an oxidation-reduction reaction of the electrochromic compound, the electrochromic compound and a metal oxide particle(s) may be mixed to be a single layer.

A metal oxide particle included in the third electrochromic layer 15c may be a white pigment particle. Thereby, it is possible for the third electrochromic layer 15c to have a white color reflection function.

A white pigment particle not particularly limited and it is possible to list a metal oxide particle such as a titanium oxide particle, an aluminum oxide particle, a zinc oxide particle, a silicon oxide particle, a cesium oxide particle, or a yttrium oxide particle.

Because the electrochromic display element 10 has a structure as described above, a multicolor display is possible. It is possible to control an electric potential of the first display electrode 14a with respect to the opposed electrode 16, an electric potential of the second display electrode 14b with respect to the opposed electrode 16, and an electric potential of the third display electrode 14c with respect to the opposed electrode 16, independently. As a result, it is possible to color and/or discolor the first electrochromic layer 15a that contacts and is formed on the first display electrode 14a, the second electrochromic layer 15b that contacts and is formed on the second display electrode 14b, and the third electrochromic layer 15c that contacts and is formed on the third display electrode 14c, independently.

Because the first electrochromic layer 15a, the second electrochromic layer 15b, and the third electrochromic layer 15c are laminated, a multicolor display is possible due to coloring and/or discoloring patterns of the first electrochromic layer 15a, the second electrochromic layer 15b, and the third electrochromic layer 15c. Furthermore, as the first electrochromic layer 15a, the second electrochromic layer 15b, and the third electrochromic layer 15c include electrochromic compounds that color yellow, magenta, and cyan, a full color display of the electrochromic display element 10 is possible.

Figure 2:
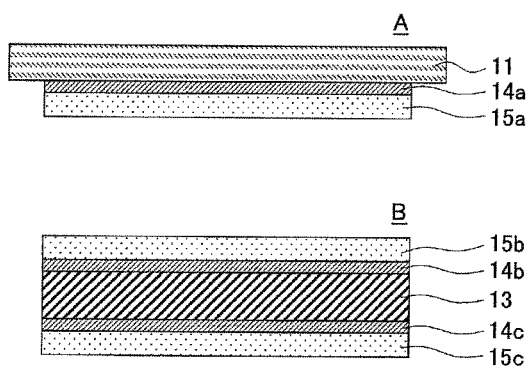
FIG. 2 is a cross-sectional view that illustrates a display component of an electrochromic display element in FIG. 1.

As illustrated in FIG. 2, a first display component A and a second display component B are fabricated for the electrochromic display element 10, and thereby, it is possible to ensure insulation among the first display electrode 14a, the second display electrode 14b, and the third display electrode 14c readily.

Herein, the first display component A is such that the first display electrode 14a and the first electrochromic layer 15a are sequentially laminated on the display substrate 11. On the other hand, the second display component B is such that the second display electrode 14b and the second electrochromic layer 15b are sequentially laminated on one face of the porous film 13 and the third display electrode 14c and the third electrochromic layer 15c are sequentially laminated on the other face thereof.

Furthermore, because it is possible to bond or adsorb each electrochromic compound after a film that includes a metal oxide particle(s) is formed on the porous film 13, it is possible to form the second electrochromic layer 15b and the third electrochromic layer 15c easily or conveniently.

Here, an order of lamination of the first display electrode 14a and the first electrochromic layer 15a in the first display component A may be reversed.

Furthermore, an order of lamination of the second display electrode 14b and the second electrochromic layer 15b and/or an order of lamination of the third display electrode 14c and the third electrochromic layer 15c in the second display component B may be reversed.

The display substrate 11 is not particularly limited as long as a transparent one is provided, and it is possible to list a glass substrate, a plastic substrate, or the like.

For a material that constitutes a plastic substrate, it is possible to list a polycarbonate, a poly(ethylene), a poly(styrene), a poly(ethyleneterephthalate), a poly(trimethyleneterephthalate), a poly(butyleneterephthalate), a poly(ethylenenaphthalate), a poly(butylenenaphthate), or the like.

Here, as a plastic film is used for the display substrate 11, it is possible to fabricate a lightweight and flexible electrochromic display element.

A material that constitutes the first display electrode 14a, the second display electrode 14b, and/or the third display electrode 14c is not particularly limited as long as one that has an electrical conductivity and is transparent is provided, and it is possible to list a tin-doped indium oxide (that will be referred to as an ITO, below), a fluorine-doped tin oxide (that will be referred to as an FTO, below), an antimony-doped tin oxide (that will be referred to as an ATO, below), or the like. Among them, an indium oxide (that will be referred to as an In oxide, below), a tin oxide (that will be referred to as an Sn oxide, below), or a zinc oxide (that will be referred to as an Zn oxide, below) is preferable, and InSnO, GaZnO, an SnO, $In_2O_3$, or ZnO is particularly preferable.

The opposed substrate 12 is not particularly limited, and it is possible to list a glass substrate, a plastic film, or the like.

A material that constitutes the opposed electrode 16 is not particularly limited as long as one that has an electrical conductivity is provided, and it is possible to list an ITO, an FTO, a zinc oxide, a zinc, a platinum, a carbon, or the like.

Here, in a case where a metal plate such as a zinc plate is used for the opposed substrate 12, the opposed substrate doubles as the opposed electrode 16.

In a case where a material that constitutes the opposed electrode 16 causes a reaction that is reverse to an oxidation-reduction reaction caused in the first electrochromic layer 15a, the second electrochromic layer 15b, and/or the third electrochromic layer 15c, it is possible to color or discolor stably. For example, as a material that constitutes the opposed electrode 16 is reduced in a case where the first electrochromic layer 15a, the second electrochromic layer 15b, and/or the third electrochromic layer 15c color(s) due to oxidation thereof, a coloring reaction and a discoloring reaction in the first electrochromic layer 15a, the second electrochromic layer 15b, and/or the third electrochromic layer 15c are stable.

An electrochromic compound is not particularly limited, and it is possible to list a low-molecular weight compound such as an azobenzene-type compound, an anthraquinone-type compound, a diarylethene-type compound, a dihydroprene-type compound, a styryl-type compound, a styrylspiropyran-type compound, a spirooxazine-type compound, a spirothiopyran-type compound, a thioindigo-type compound, a tetrathiafulvalene-type compound, a terephthalic acid-type compound, a triphenylmethane-type compound, a triphenylamine-type compound, a naphthopyran-type compound, a viologen-type compound, a pyrazoline-type compound, a phenazine-type compound, a phenylenediamine-type compound, a phenoxazine-type compound, a phenothiazine-type compound, a phthalocyanine-type compound, a fluoran-type compound, a fulgide-type compound, a benzopyran-type compound, or a metallocene-type compound; or a polymer compound such as a poly(aniline) or a poly(thiophene)

It is preferable for an electrochromic compound to include a dipyridine-type compound represented by a general formula of:

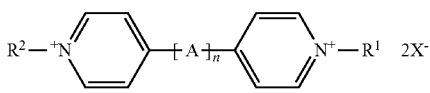

(in the formula, each of $R^1$ and $R^2$ is independently an alkyl group with a carbon number of 1-8 that may have a substituent or an aryl group, wherein $R^1$ and/or $R^2$ has/have a substituent selected from a group composed of a carboxyl group (—COOH), a phosphonic acid group (—PO(OH)$_2$), and a group represented by a general formula of —Si(OC$_k$H$_{2k+1}$)$_3$ (in the formula, k is 0, 1, or 2.), X$^-$ is a monovalent anion, n is 0, 1, or 2, and A is an alkylene group with a carbon number of 1-20 that may have a substituent, an arylene group, or a divalent heterocyclic group.). Because an electric potential(s) for coloring and/or discoloring of a dipyridine compound is/are low, good color value of coloring is exhibited due to a reduction electric potential.

A metal oxide particle is not particularly limited and it is possible to list a titanium oxide particle, a zinc oxide particle, a tin oxide particle, an aluminum oxide (alumina) particle, a zirconium oxide particle, a cerium oxide particle, a silicon oxide (silica) particle, an yttrium oxide particle, a boron oxide particle, a magnesium oxide particle, a strontium titanate particle, a potassium titanate particle, a barium titanate particle, a calcium titanate particle, a calcium oxide particle, a ferrite particle, a hafnium oxide particle, a tungsten oxide particle, an iron oxide particle, a copper oxide particle, a nickel oxide particle, a cobalt oxide particle, a barium oxide particle, a strontium oxide particle, a vanadium oxide particle, an aluminosilicic acid particle, a calcium phosphate particle, an aluminosilicate particle, or the like, wherein two or more kinds thereof may be used in combination. Among them, a titanium oxide particle, a zinc oxide particle, a tin oxide particle, an alumina particle, a zirconium oxide particle, an iron oxide particle, a magnesium oxide particle, an indium oxide particle, or a tungsten oxide particle is preferable because a response speed of coloring and/or discoloring is excellent.

An average primary particle diameter of a metal oxide particle(s) is usually 3-30 nm, and it is preferable to be 5-20 nm. Thereby, it is possible to carry an electrochromic compound efficiently and a display excellent in a display contrast ratio is possible.

A thickness(es) of the first electrochromic layer 15a, the second electrochromic layer 15b, and/or the third electrochromic layer 15c is/are usually 0.2-5.0 μm. If a thickness(es) is/are less than 0.2 μm, a coloring density may be lowered, and if greater than 5.0 μm is provided, visibility may be degraded.

A resistance among the first display electrode 14a, the second display electrode 14b, and the third display electrode 14c has to be high to an extent that it is possible to control an electric potential of a display electrode with respect to the opposed electrode 16 independently of an electric potential of another display electrode with respect to the opposed electrode 16, and at least, has to be higher than sheet resistances of the first display electrode 14e, the second display electrode 14b, and the third display electrode 14c.

As a voltage is applied to either one of the first display electrode 14a, the second display electrode 14b, and the third display electrode 14c in a case where a resistance among the first display electrode 14a, the second display electrode 14b, and the third display electrode 14c is lower than a sheet resistance of the first display electrode 14a, the second display electrode 14b, or the third display electrode 14c, a same degree of a voltage is also applied to another display electrode so that is not possible to discolor an electrochromic layer that corresponds to each display electrode, independently.

It is preferable for a resistance among the first display electrode 14a, the second display electrode 14b, and the third display electrode 14c to be equal to or greater than 500 times sheet resistances of the first display electrode 14a, the second display electrode 14b, and the third display electrode 14c.

The electrolyte solution 17 is such that an electrolyte is dissolved in a solvent.

An electrolyte is not particularly limited, and it is possible to list LiClO$_4$, LiBF$_4$, LiAsF$_6$, LiPF$_6$, CF$_3$SO$_3$Li, CF$_3$COOLi, KCl, NaClO$_3$, NaCl, NaBF$_4$, NaSCN, KBF$_4$, Mg(ClO$_4$)$_2$, Mg(BF$_4$)$_2$, a tetrabutylammonium perchlorate, or the like.

A solvent is not particularly limited as long as it is possible to dissolve an electrolyte therein, and it is possible to list a propylene carbonate, an acetonitrile, a γ-butyrolactone, an ethylene carbonate, a sulfolane, a dioxolane, a tetrahydrofuran, a 2-methyltetrahydrofuran, a dimethyl sulfoxide, a 1,2-dimethoxyethane, a 1,2-ethoxymethoxyethane, a polyethylene glycol, an alcohol, or the like.

Here, a solid electrolyte such as a gel-like electrolyte or a polymer electrolyte may be used instead of electrolyte solution 17. Thereby, it is possible to improve a strength and reliability of such an element and it is possible to suppress coloring diffusion.

It is preferable to hold an electrolyte and a solvent in a resin so as to immobilize the electrolyte. Thereby, it is possible to obtain a high ionic conductance and solid strength.

It is possible for a resin to be a photo-setting resin. Thereby, it is possible to manufacture such an element at a low temperature for a short period of time.

A resin is not particularly limited and it is possible to list an urethane, an ethylene glycol, a propylene glycol, a vinyl alcohol, an acryl, an epoxy, or the like.

Furthermore, an ionic liquid may be used instead of the electrolyte solution 17.

Furthermore, a white pigment particle(s) may be dispersed in the electrolyte solution 17. Thereby, it is possible for the electrolyte solution 17 to have a function of white color reflection.

A white pigment particle is not particularly limited and it is possible to list a metal oxide particle such as a titanium oxide particle, an aluminum oxide particle, a zinc oxide particle, a silicon oxide particle, a cesium oxide particle, or an yttrium oxide particle.

A content of a white pigment particle(s) in the electrolyte solution 17 is usually 10-50% by mass.

A material that constitutes the porous film 13 is not particularly limited as long as one that is inactive with the electrolyte solution 17 and is transparent is provided, and it is possible to list a polyolefin, a polycarbonate, a polyester, a polymethacrylate, a polyacetal, a poly(vinylidene chloride), a poly(vinylidene fluoride), a poly(tetrafluoroethylene), a polyurethane, or the like. Among them, a polyolefin, a poly(vinylidene fluoride), or a poly(tetrafluoroethylene) is preferable from the viewpoint of a chemical stability and an electrical insulation property.

The porous film 13 is a film that has a number of through-holes.

The porous film 13 is not particularly limited and it is possible to list a non-woven fabric, a self-supported film wherein a through-hole is formed in a plastic substrate by a heavy ion beam, or the like.

For the porous film 13, it is preferable for a through-hole to be formed in a direction of a thickness thereof. A through-hole of the porous film 13 plays a role to cause a gas phase to escape when the electrolyte solution 17 permeates through the first electrochromic layer 15a, the second electrochromic layer 15b, and the third electrochromic layer 15c. It is possible to prevent generation of a display irregularity, response speed irregularity, a delay, or the like, of the electrochromic display element 10 that is caused by a residue of a gas phase, by causing the gas phase to escape through a through-hole of the porous film 13. Furthermore, it is possible to cause an electrochemical reaction, because the electrolyte solution 17 readily penetrates through a through-hole of the porous film 13.

A thickness of a non-woven fabric is usually 5-500 μm, and it is preferable to be 10-150 μm. If a thickness of a non-woven fabric is less than 5 μm, a strength of the porous film 13 may be lowered, and if greater than 500 μm is provided, a responsiveness of the electrochromic display element 10 may be degraded.

A fiber diameter of a non-woven fabric is usually 0.2-15 μm and it is preferable to be 0.5-5 μm. If a fiber diameter of a non-woven fabric is less than 0.2 μm, a strength of the porous film 13 may be lowered, and if greater than 15 μm is provided, an ionic conductance of the electrochromic display element 10 may be degraded.

A porosity of a non-woven fabric is usually 40-90% and it is preferable to be 60-80%. If a porosity of a non-woven fabric is less than 40%, an ionic conductance of the electrochromic display element 10 may be lowered, and if greater than 90% is provided, a strength of the porous film 13 may be lowered.

A diameter of a through-hole of a self-supported film is usually 0.01-100 μm, and it is preferable to be 0.1-5 μm. If a diameter of a through-hole of a self-supported film is less than 0.01 μm, an ionic conductivity of the electrochromic display element 10 may be degraded, and if greater than 100 μm is provided, a display electrode is not formed directly above a through-hole so that deficiency in a display performance may be caused.

A ratio of a surface area of a through-hole(s) to an entire surface area with respect to a surface of the porous film 13 is usually 0.01-30%. If a ratio of a surface area of a through-hole(s) to an entire surface area with respect to a surface of the porous film 13 is less than 0.01%, an ionic conductivity of the electrochromic display element 10 may be degraded, and if greater than 30% is provided, a surface area where a display electrode is not formed is large so that deficiency in a display performance may be caused.

FIG. 3A and FIG. 3B illustrate another example of an electrochromic display element. Here, FIG. 3A and FIG. 3B are a cross-sectional view and a top view, respectively. Furthermore, in FIG. 3A and FIG. 3B, a configuration identical to that of FIG. 1 is provided with an identical reference numeral or sign, and a description(s) thereof will be omitted.

An electrochromic display element 20 has regions where a first display electrode 14a, a second display electrode 14b, and a third display electrode 14c do not overlap with one another. Hence, the first display electrode 14a is electrically connected thereto via a first drawing part 21a and a contact 22a that are formed on or above an opposed substrate 12. Furthermore, the second display electrode 14b is electrically connected thereto via a transparent electrically conductive film 23 and a contact 22b that are formed on or below a display substrate 11. Moreover, the transparent electrically conductive film 23 is electrically connected thereto via a second drawing part 21b and a contact 22c that are formed on or above the opposed substrate 12. Furthermore, the third display electrode 14c is electrically connected thereto via a third drawing part 21c and a contact 22d that are formed on or above an opposed substrate 16.

A material that constitutes the first drawing part 21a, the second drawing part 21b, and/or the third drawing part 21c is not particularly limited as long as one that has an electrical conductance is provided, and it is possible list Cu, W, Ti, Al, Mo, Cr, Ni, and/or an alloy thereof, an ITO, an FTO, a zinc oxide, a zinc, a platinum, a carbon, or the like.

A material that constitutes a contact 22a, 22b, 22c, and/or 22d is not particularly limited and it is possible to list an ultraviolet-ray-curable resin that includes an electrically conductive particle(s), a thermosetting resin that includes an electrically conductive particle(s), or the like.

An electrically conductive particle is not particularly limited and it is possible to list an Au-coated particle, an Ag particle, a Cu particle, a carbon particle, or the like.

A material that constitutes the transparent electrically conductive film 23 is similar to that/those of the first display electrode 14a, the second display electrode 14b, and/or the third display electrode 14c.

For the porous film 13, it is preferable that a pore(s) is/are filled or a pore(s) is/are not formed in a region where the second display electrode 14b is electrically connected to the transparent electrically conductive film 23 and/or a region where the third display electrode 19c is electrically connected to the third drawing part 21c. Thereby, a strength of the porous film 13 is improved so that it is possible to suppress damage on the porous film 13 in a pressurization process at a time when a contact is formed, or the like. Furthermore, it is possible to mitigate contamination, corrosion, or the like, caused by an electrolyte solution 17, remaining free water, oxygen, or the like.

Here, it is possible to apply an electrochromic display element to a display device such as an electronic paper or a light control element.

Practical Example 1

Fabrication of a First Display Component A

First, an ITO film with a thickness of 100 nm (first display electrode 14a) was formed in an area of 30 mm×38 mm on a 40 mm×40 mm glass substrate (display substrate by a sputtering method. As a sheet resistance between edge portions of the first display electrode 14a was measured, about 200Ω was provided.

Then, after a dispersion fluid SP210 of titanium oxide nanoparticles with an average primary particle diameter of 20 nm (produced by Showa Titanium Co., Ltd.) was applied onto the first display electrode 14a by a spin-coating method, an annealing process was conducted at 120° C. for 15 minutes to form a film that includes titanium oxide particles. Then, after a 0.8% by mass solution of a viologen-type compound represented by a chemical formula of:

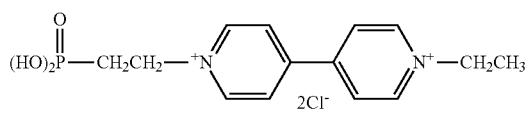

in 2,2,3,3-tetrafluoropropanol was applied thereto by a spin-coating method, an annealing process was conducted at 120° C. for 10 minutes to form a first electrochromic layer 15a that included titanium oxide particles that carried the viologen-type compound and obtained a first display component A.

Fabrication of a First Display Component B

After a 40 mm×30 mm polyethylene porous film SUNMAP LC series (produced by NITTO DENKO CORPORATION) (porous film 13) was fixed on a 40 mm×40 mm glass substrate by using a tape, an ITO film with a thickness of 100 nm (second display electrode 14b) was formed in an area of 35 mm×30 mm on the porous film 13 by a sputtering method. As a sheet resistance between edge portions of the second display electrode 14b was measured, about 200Ω was provided.

The porous film 13 with the second display electrode 14b formed thereon was released from the glass substrate, and subsequently reversed and fixed on the glass substrate by using a tape. An ITO film with a thickness of 100 nm (third display electrode 14c) was formed in an area of 35 mm×30 mm on the porous film 13 by a sputtering method so as to alternate with the second display electrode 14b. As a sheet resistance between edge portions of the third display electrode 14c was measured, about 200Ω was provided.

The porous film 13 with the third display electrode 14c formed thereon was released from the glass substrate, subsequently reversed and fixed on the glass substrate by using a tape. Then, after a dispersion fluid SP210 of titanium oxide nanoparticles with an average primary particle diameter of 20 nm (produced by Showa Titanium Co., Ltd.) was applied onto the second display electrode 14b by a spin-coating method, an annealing process was conducted at 120° C. for 15 minutes to form a film that included titanium oxide particles. Moreover, after a 1% by mass solution of a viologen-type compound represented by a chemical formula of:

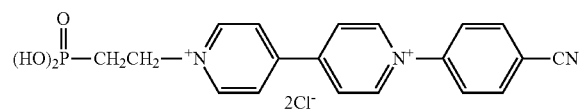

in 2,2,3,3-tetrafluoropropanol was applied thereto by a spin-coating method, an annealing process was conducted at 120° C. for 10 minutes to form a second electrochromic layer 15b that included titanium oxide particles that carried the viologen-type compound.

The porous film 13 with the second electrochromic layer 15b formed thereon was released from the glass substrate, and subsequently reversed and fixed on the glass substrate by using a tape. Then, after a dispersion fluid SP210 of titanium oxide nanoparticles with an average primary particle diameter of 20 nm (produced by Showa Titanium Co., Ltd.) was applied onto the third display electrode 14c by a spin-coating method, an annealing process was conducted at 120° C., for 15 minutes to form a film that included titanium oxide particles. Moreover, after a 1% by mass solution of a dipyridine-type compound represented by a chemical formula of:

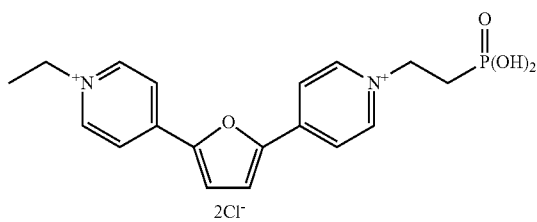

in 2,2,3,3-tetrafluoropropanol was applied thereto by a spin-coating method, an annealing process was conducted at 120° C. for 10 minutes to form a third electrochromic layer 15c that included titanium oxide particles that carried the dipyridine-type compound.

The porous film 13 with the third electrochromic layer 15c formed thereon was released from the glass substrate to obtain a second display component B.

(Fabrication of an Opposed Electrode)

An ITO film with a thickness of 100 nm was formed in an area of 20 mm×25 mm on a 40 mm×40 mm glass substrate (opposed substrate 12) by a sputtering method. Then, after a 20% by mass dispersion fluid of tin oxide particles with an average primary particle diameter of 30 nm in 2,2,3,3-tetrafluoropropanol (produced by Mitsubishi Materials Corporation) was applied onto the ITO film by e spin-coating method, an annealing process was conducted at 120° C. for 15 minutes to form a film with a thickness of 2 μm that included tin oxide particles or form an opposed electrode 16.

(Fabrication of an Electrochromic Display Element)

Figure 4:
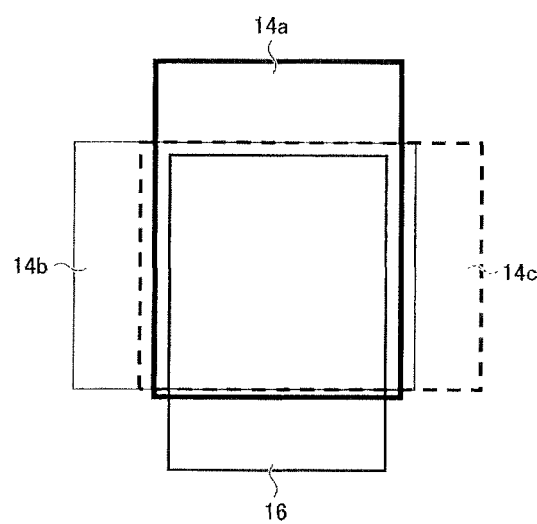
FIG. 4 is a diagram that illustrates arrangement of a display electrode and an opposed electrode in Practical Example 1.

After the third electrochromic layer 15c of the display component B was placed on the opposed electrode 16, a 0.1 M solution of tetrabutylammonium perchlorate in dimethyl sulfoxide (electrolyte solution 17) was dropped thereto. Then, the first display electrode 14a of the display component A was bonded via a 75 μm spacer 18 so as to be opposed to the opposed electrode 16 and to enclose the electrolyte solution 17, so that an electrochromic display element was obtained (see FIG. 4).

(A Resistance Between Electrodes)

Resistances between the first display electrode 14a and the second display electrode 14b and between the second display electrode 14b and the third display electrode 14c of the electrochromic display element were measured. As a result, a good insulation property was obtained that was equal to or greater than 100 kΩ that was about 500 times the sheet resistances between the edge portions of the display electrodes.

(A Coloring and/or Discoloring Test)

A voltage was applied to the electrochromic display element to evaluate coloring and discoloring thereof. Herein, an applied voltage was 3.0 V and a period of time for applying the voltage was 2 seconds. Here, the display electrodes were connected to a negative electrode and the opposed electrode was connected to a positive electrode.

As a voltage was applied between the first display electrode 14a and the opposed electrode 16, the first electrochromic layer 15a was colored with a blue color. Furthermore, as a voltage was applied between the second display electrode 14b and the opposed electrode 16, the second electrochromic layer 15b was colored with a green color. Moreover, as a voltage was applied between the third display electrode 14c and the opposed electrode 16, the third electrochromic layer 15c was colored with a magenta color. Herein, it was possible for each electrochromic layer to provide a color independently and it was possible to stably keep a color that was first colored independently.

APPENDIX

An Illustrative Embodiment(s) of an Electrochromic Display Element

At least one illustrative embodiment of the present invention may relate to at least one of an electrochromic display element and a display device.

An object of at least one illustrative embodiment of the present invention may be to provide an electrochromic display element capable of suppressing a light loss.

At least one illustrative embodiment of the present invention may be an electrochromic display element having a display substrate and an opposed substrate that is opposed to the display substrate, wherein an opposed electrode is formed at a display-substrate-opposed side of the opposed substrate, wherein a first display electrode and a first electrochromic layer are laminated at an opposed-substrate-opposed side of the display substrate, wherein a single porous film is formed between the display substrate and the opposed substrate, wherein a second display electrode and a second electrochromic layer are laminated at a display-substrate-opposed side of the porous film, wherein a third display electrode and a third electrochromic layer are laminated at an opposed-substrate-opposed side of the porous film, and wherein an electrolyte is present between the display substrate and the opposed substrate.

Illustrative Embodiment (1) is an electrochromic display element, characterized by having a display substrate and an opposed substrate that is opposed to the display substrate, wherein an opposed electrode is formed at a display-substrate-opposed side of the opposed substrate, wherein a first display electrode and a first electrochromic layer are laminated at an opposed-substrate-opposed side of the display substrate, wherein a single porous film is formed between the display substrate and the opposed substrate, wherein a second display electrode and a second electrochromic layer are laminated at a display-substrate-opposed side of the porous film, wherein a third display electrode and a third electrochromic layer are laminated at an opposed-substrate-opposed side of the porous film, and wherein an electrolyte is present between the display substrate and the opposed substrate.

Illustrative Embodiment (2) is the electrochromic display element as described in Illustrative Embodiment (1), characterized in that each of the first electrochromic layer, the second electrochromic layer, and the third electrochromic layer include a metal oxide particle that carries an electrochromic compound.

Illustrative Embodiment (3) is the electrochromic display element as described in Illustrative Embodiment (1) or (2), characterized in that the first display electrode, the second display electrode, and the third display electrode have regions that do not overlap with one another.

Illustrative Embodiment (4) is the electrochromic display element as described in Illustrative Embodiment (3), characterized in that the first display electrode is electrically connected to a first drawing part formed on the opposed substrate, the second display electrode is electrically connected to a second drawing part formed on the opposed substrate through an electrically conductive film formed on the display substrate, and the third display electrode is electrically connected to a third drawing part formed on the opposed substrate.

Illustrative Embodiment (5) is the electrochromic display element as described in Illustrative Embodiment (4), characterized in that the porous film is such that a pore is filled or a pore is not formed in a region where the second display electrode is electrically connected to the electrically conductive film and a region where the third display electrode is electrically connected to the third drawing part.

Illustrative Embodiment (6) is a display device characterized by having the electrochromic display element as described in any one of Illustrative Embodiments (1) to (5).

According to at least one illustrative embodiment of the present invention, it may be possible to provide an electrochromic display element capable of suppressing a light loss.

Although the illustrative embodiment(s) and/or specific example(s) of the present invention has/have been described with reference to the accompanying drawing(s), the present invention is not limited to any of the illustrative embodiment(s) and/or specific example(s), and the illustrative embodiment(s) and/or specific example(s) may be altered, modified, or combined without departing from the scope of the present invention.

The present application claims the benefit of priority based on Japanese Patent Application No. 2013-054303 filed on Mar. 15, 2013, the entire contents of which are herein incorporated by reference.

What is claimed is:

1. An electrochromic display element, comprising:
   a display substrate;
   an opposed substrate that is opposed to the display substrate;
   an opposed electrode being formed at a display-substrate-opposed side of the opposed substrate;
   a first display electrode and a first electrochromic layer being laminated at an opposed-substrate-opposed side of the display substrate;
   a single porous film being formed between the display substrate and the opposed substrate;
   a second display electrode and a second electrochromic layer being laminated at a display-substrate-opposed side of the porous film;
   a third display electrode and a third electrochromic layer being laminated at an opposed-substrate-opposed side of the porous film; and
   an electrolyte being present between the display substrate and the opposed substrate.

2. The electrochromic display element as claimed in claim 1, wherein each of the first electrochromic layer, the second electrochromic layer, and the third electrochromic layer includes a metal oxide particle that carries an electrochromic compound.

3. The electrochromic display element as claimed in claim 1, wherein the first display electrode, the second display electrode, and the third display electrode have regions that do not overlap with one another.

4. The electrochromic display element as claimed in claim 3, wherein the first display electrode is electrically connected to a first drawing part formed on the opposed substrate, the second display electrode is electrically connected to a second drawing part formed on the opposed substrate through an electrically conductive film formed on the display substrate, and the third display electrode is electrically connected to a third drawing part formed on the opposed substrate.

5. The electrochromic display element as claimed in claim 4, wherein the porous film is such that a pore is filled or a pore is not formed in a region where the second display electrode is electrically connected to the electrically conductive film and a region where the third display electrode is electrically connected to the third drawing part.

6. A display device, comprising the electrochromic display element as claimed in claim 1.

* * * * *